（12） United States Patent
Peng et al.

(10) Patent No.: US 12,499,366 B2
(45) Date of Patent: Dec. 16, 2025

(54) METHOD OF PROCESSING DATA FOR TARGET MODEL, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Juncai Peng, Beijing (CN); Yujuan Cheng, Beijing (CN); Chunwei Yan, Beijing (CN); Qiwen Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 689 days.

(21) Appl. No.: 17/939,697

(22) Filed: Sep. 7, 2022

(65) Prior Publication Data

US 2023/0009941 A1 Jan. 12, 2023

(30) Foreign Application Priority Data

Sep. 9, 2021 (CN) .......................... 202111058702.1

(51) Int. Cl.
*G06N 3/082* (2023.01)
*G06N 3/09* (2023.01)

(52) U.S. Cl.
CPC .............. *G06N 3/082* (2013.01); *G06N 3/09* (2023.01)

(58) Field of Classification Search
CPC ......... G06N 3/0464; G06N 3/082; G06N 3/09
See application file for complete search history.

(56) References Cited

U.S. PATENT DOCUMENTS

| 10,558,738 B1 | 2/2020 | Strimel et al. |
| 2020/0013176 A1* | 1/2020 | Kang ..................... G06N 20/00 |
| 2021/0174214 A1* | 6/2021 | Venkatesan .............. G06N 3/08 |
| 2022/0114479 A1* | 4/2022 | Zhao ................... G06N 3/0985 |

FOREIGN PATENT DOCUMENTS

| CN | 108229646 | 6/2018 |
| CN | 110874635 | 3/2020 |
| CN | 111898484 | 11/2020 |

OTHER PUBLICATIONS

Office Action issued in corresponding Chinese Patent Application No. 202111058702.1, dated Jul. 29, 2022.

* cited by examiner

*Primary Examiner* — Eric Nilsson
(74) *Attorney, Agent, or Firm* — Pillsbury Winthrop Shaw Pittman LLP

(57) ABSTRACT

A method of processing data for a target model, an electronic device, and a storage medium, which relate to a field of deep learning. The method of processing data for a target model includes: acquiring the target model, wherein the target model includes at least one network layer, and each network layer of the at least one network layer includes a plurality of model parameters; for a target network layer in the at least one network layer, dividing the plurality of model parameters of the target network layer into a plurality of groups; and adjusting a data type of the model parameters in the plurality of groups from a first data type to a second data type respectively, so as to obtain a processed target model.

20 Claims, 6 Drawing Sheets

METHOD OF PROCESSING DATA FOR TARGET MODEL, ELECTRONIC DEVICE, AND STORAGE MEDIUM

This application is claims priority to Chinese Application No. 202111058702.1 filed on Sep. 9, 2021, which is incorporated herein in its entirety by reference.

TECHNICAL FIELD

The present disclosure relates to a field of computer technology, in particular to a field of deep learning, and more specifically, to a method of processing data for a target model, an electronic device, and a storage medium.

BACKGROUND

Deep learning technology is widely used in vision, natural language processing and other fields. On review of the development of deep learning models, it may be found that a network structure of the deep learning model is becoming more and more complex, corresponding parameters of the model are increasing, and an amount of calculation is also increasing. This leads to a large number of resources consumed in using the deep learning model.

SUMMARY

The present disclosure provides a method of processing data for a target model, an electronic device, and a storage medium.

According to an aspect of the present disclosure, there is provided a method of processing data for a target model, including: acquiring the target model, the target model includes at least one network layer, and each network layer of the at least one network layer includes a plurality of model parameters; for a target network layer in the at least one network layer, dividing the plurality of model parameters of the target network layer into a plurality of groups; and adjusting a data type of the model parameters in the plurality of groups from a first data type to a second data type respectively, so as to obtain a processed target model.

According to another aspect of the present disclosure, there is provided a method of processing data for a target model, including: determining a target network layer from at least one network layer of the target model, each network layer of the at least one network layer includes a plurality of model parameters; determining a plurality of groups to which the plurality of model parameters of the target network layer belong; and adjusting a data type of the model parameters in the plurality of groups from a second data type to a first data type respectively, so as to obtain a processed target model.

According to another aspect of the present disclosure, there is provided an electronic device including: at least one processor; and a memory communicatively connected to the at least one processor, the memory stores instructions executable by the at least one processor, and the instructions, when executed by the at least one processor, cause the at least one processor to implement the method of processing data for a target model described above.

According to another aspect of the present disclosure, there is provided a non-transitory computer-readable storage medium having computer instructions therein, the computer instructions are configured to cause a computer to implement the method of processing data for a target model described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The terms used herein are only for describing specific embodiments and are not intended to limit the present disclosure. The terms "including", "comprising" and the like used herein indicate a presence of the features, steps, operations and/or components, but do not exclude a presence or addition of one or more other features, steps, operations or components.

All terms (including technical and scientific terms) used herein have the meanings generally understood by those skilled in the art, unless otherwise defined. It should be noted that the terms used herein should be interpreted as having meanings consistent with the context of this description and should not be interpreted in an idealized or overly rigid manner.

In a case of using an expression similar to "at least one of A, B and C", it should be interpreted according to the meaning of the expression generally understood by those skilled in the art (for example, "system having at least one of A, B and C" should include but not limited to a system having A alone, a system having B alone, a system having C alone, a system having A and B, a system having A and C, a system having B and C, and/or a system having A, B and C).

According to the embodiments of the present disclosure, a method of processing data for a target model is provided. The method of processing data for a target model includes acquiring the target model. The target model includes at least one network layer, and each network layer of the at least one network layer includes a plurality of model parameters. Then, for a target network layer in the at least one network layer, the plurality of model parameters of the target network layer are divided into a plurality of groups. Then, a data type of the model parameters in the plurality of groups is adjusted from a first data type to a second data type respectively, so as to obtain a processed target model.

Figure 1:
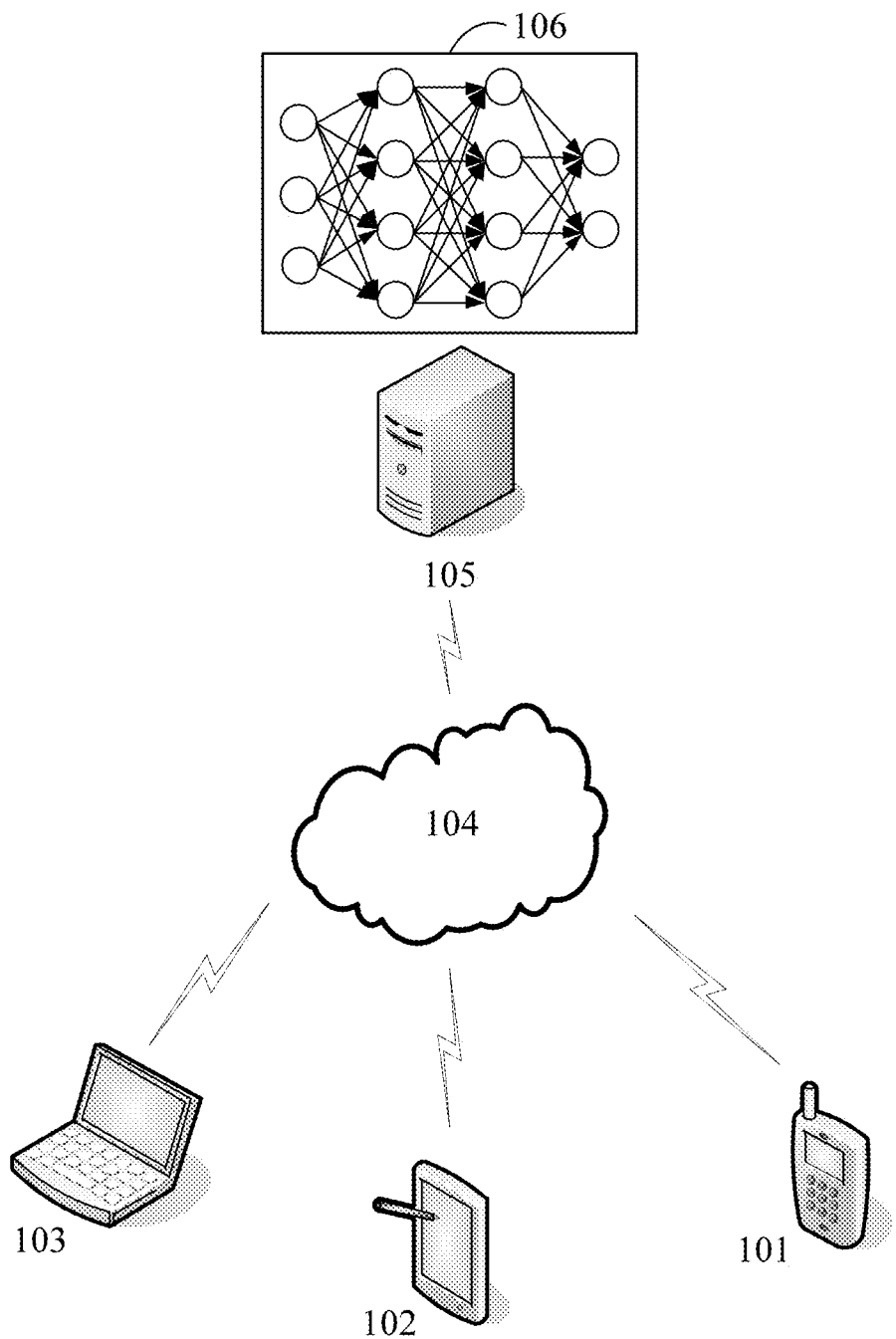
FIG. 1 schematically shows a system architecture of a method and an apparatus of processing data for a target model according to an embodiment of the present disclosure.

FIG. 1 schematically shows a system architecture of a method and an apparatus of processing data for a target model according to an embodiment of the present disclosure. It should be noted that FIG. 1 shows only an example of a system architecture to which embodiments of the present disclosure may be applied, so as to help those skilled in the art to understand the technical content of the present disclosure, but it does not mean that embodiments of the present disclosure may not be applied to other devices, systems, or scenes.

As shown in FIG. 1, a system architecture 100 according to the embodiment may include clients 101, 102, and 103, a network 104 and an electronic device 105. The network 104 is used as a medium for providing communication links between the clients 101, 102, 103 and the electronic device 105. The network 104 may include various connection types, such as wired communication links, wireless communication links, or fiber optic cables, etc.

A user may use the clients 101, 102, and 103 to interact with the electronic device 105 via the network 104 to receive or send messages and the like. Various communication client applications, such as shopping applications, web browser applications, search applications, instant messaging tools, email clients, social platform software, etc. (only examples), may be installed on the clients 101, 102 and 103.

The clients 101, 102, and 103 may be various electronic devices having a display screen and supporting web browsing, including but not limited to smartphones, tablet computers, laptops and desktop computers, and the like. For example, the clients 101, 102, and 103 may include edge devices.

The electronic device 105 may be a server that provides various services, such as a background management server (only an example) that provides support for websites browsed by the user using the clients 101, 102, and 103. The background management server may analyze and process a received user request and other data, and feedback a processing result (such as web pages, information, or data obtained or generated according to the user request) to the client. In addition, the electronic device 105 may also be a cloud server, that is, the electronic device 105 may have a cloud computing function.

It should be noted that, the method of processing data for a target model provided in the embodiments of the present disclosure includes, for example, compressing model parameters of the target model, and restoring model parameters of the target model.

For example, the method of compressing model parameters of the target model may be implemented by the electronic device 105. Correspondingly, an apparatus of compressing model parameters of the target model may be provided in the electronic device 105.

For example, the method of restoring model parameters of the target model may be implemented by the clients 101, 102, and 103. Correspondingly, an apparatus of restoring model parameters of the target model may be provided in the clients 101, 102, and 103.

For example, a target model 106 includes a plurality of model parameters. After acquiring the target model 106, the electronic device 105 may compress the model parameters of the target model 106 to obtain a processed target model. Then, the electronic device 105 may send the processed target model to the clients 101, 102 and 103 via the network 104. After receiving the processed target model, the clients 101, 102 and 103 may restore the model parameters of the processed target model, and use the restored target model to process related data.

It should be understood that the numbers of the clients, network and electronic device in FIG. 1 are merely illustrative. There may be any number of clients, networks and electronic devices depending on the implementation needs.

According to the embodiments of the present disclosure, a method of processing data for a target model is provided. The method of processing data for a target model according to the exemplary embodiments of the present disclosure is described with reference to FIG. 2 in conjunction with the system architecture in FIG. 1. The method of processing data for a target model according to the embodiments of the present disclosure may be implemented by, for example, the electronic device 105 shown in FIG. 1.

Figure 2:
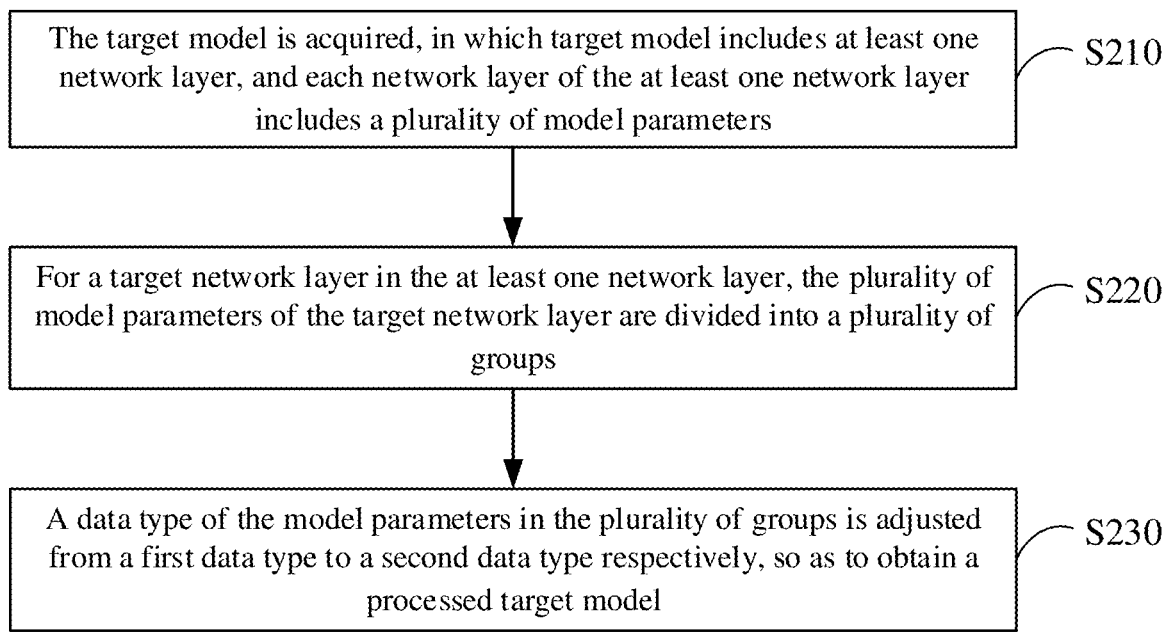
FIG. 2 schematically shows a flowchart of a method of processing data for a target model according to an embodiment of the present disclosure.

FIG. 2 schematically shows a flowchart of a method of processing data for a target model according to an embodiment of the present disclosure.

As shown in FIG. 2, the method 200 of processing data for a target model according to the embodiments of the present disclosure may include, for example, operations S210 to S230.

In operation S210, the target model is acquired, in which the target model includes at least one network layer, and each network layer of the at least one network layer includes a plurality of model parameters.

In operation S220, for a target network layer in the at least one network layer, the plurality of model parameters of the target network layer are divided into a plurality of groups.

In operation S230, a data type of the model parameters in the plurality of groups is adjusted from a first data type to a second data type respectively, so as to obtain a processed target model.

For example, the target model includes a deep learning model. The deep learning model may include a convolutional neural network model, an artificial neural network model and other models having predicting functions. For example, the target model may be a trained model.

Taking convolutional neural network model as an example, the convolutional neural network model includes a plurality of network layers such as convolutional layer(s), pooling layer(s), and fully connected layer(s). Each network layer includes, for example, a plurality of model parameters, which are also referred to as model weights.

For a target network layer in the plurality of network layers, the target network layer includes, for example, a plurality of model parameters, and the plurality of model parameters are divided into a plurality of groups. Each group includes, for example, at least one model parameter, and the data type of the at least one model parameter is, for example, the first data type. For example, one or more network layers are specified from the plurality of network layers as the target network layer as required.

After the model parameters of the target network layer are divided into a plurality of groups, the data type of the at least one model parameter in each group may be adjusted from the first data type to the second data type. For example, the model parameters of the first data type occupy more storage resources than the model parameters of the second data type.

In the embodiments of the present disclosure, the model parameters of the trained target model occupy large storage resources, resulting in a large storage space consumed for storing the target model. Alternatively, sending the target model to the edge device requires more data transmission resources, and a storage space of the edge device is limited, resulting in the target model occupying too much storage space of the edge device. Therefore, according to the embodiments of the present disclosure, the model parameters are compressed or quantized by adjusting the data type of the model parameters, so as to reduce an occupation rate of the storage space for the model parameters.

In addition, since the model parameters belong to a large numerical range, the model parameters may be divided into a plurality of groups when adjusting the data type of the model parameters. There is a large difference in terms of the numerical range of the model parameters between different groups. For the plurality of groups having large difference in numerical range, the data type of the parameters in each group is adjusted separately, so as to reduce an adjustment error, thereby ensuring a model accuracy of the processed target model.

Exemplarily, the target model being a convolutional neural network is taken as an example in order to illustrate how the plurality of model parameters are divided into the plurality of groups. Taking the convolutional layer in the convolutional neural network as the target network layer, the plurality of model parameters of the target network layer include, for example, model parameters for a plurality of channels. The model parameters for each channel of the plurality of channels are determined as one group of model parameters.

For example, input data for the target model has a data dimension of M*K, and the model parameters included in the convolutional layer have a data dimension of K*N. After the input data is input into the convolutional layer for convolutional processing, a data dimension of output data is M*N. M, K, and N are all positive integers. For example, the convolutional layer includes K*N model parameters, the K*N model parameters correspond to N channels, and each of the N channels includes K model parameters. For example, when the K*N model parameters are implemented as a K*N data matrix, K model parameters of each row of the data matrix correspond to one channel, and the K model parameters for each channel are determined as a group of model parameters, so as to obtain N groups corresponding to N channels respectively.

There is a large difference in terms of the numerical range of the model parameters between different groups. Thus, for the plurality of groups having large difference in numerical range, an adjustment scale for each group of the plurality of groups is determined, so as to obtain a plurality of adjustment scales corresponding to the plurality of groups respectively, thereby improving the adjustment accuracy of the model parameters.

Then, the data type of the model parameters of the plurality of groups is adjusted from the first data type to the second data type respectively based on the plurality of adjustment scales, so as to obtain the processed target model.

That is, for each group, the data type of the model parameter in the group is adjusted using the adjustment scale corresponding to the group.

For example, the first data type includes a floating point type, and the second data type includes an integer type. For example, the model parameters of the first data type occupy more storage resources than the model parameters of the second data type. For example, when a 32-bit floating point number is adjusted to an 8-bit integer, the storage resources occupied by the data may be reduced by 4 times.

Exemplarily, for the adjustment scale of each of the plurality of groups, a target model parameter may be determined from the at least one model parameter included in each group so as to determine the adjustment scale for each group based on the target model parameter. The target model parameter is, for example, a model parameter having a largest absolute value among the at least one model parameter included in each group.

The model parameter having the largest absolute value is determined from each group as the target model parameter, and the adjustment scale for each group is determined based on the target model parameter, so that the adjustment scale is adaptive to each group. Accordingly, the accuracy of the model parameters is ensured when the at least one model parameter of each group is adjusted based on the adjustment scale.

Then, the adjustment scale for each group is calculated based on the target model parameter and a preset data length corresponding to each group.

For example, the preset data length corresponding to each group is 8 or 16. The preset data length of 8 indicates that the adjusted model parameter is an 8-bit integer. The preset data length of 16 indicates that the adjusted model parameter is a 16-bit integer.

After the adjustment scale for each group is obtained, the at least one model parameter of the first data type in each group may be divided by the adjustment scale corresponding to this group, so as to obtain at least one model parameter of the second data type.

The adjustment on the data type of the model parameters by using a dynamic off-line quantization method will be described below in a specific embodiment. Those skilled in the art may understand that this embodiment is only for understanding the embodiments of the present disclosure, and should not be considered as limiting the embodiments of the present disclosure.

Firstly, a specified target network layer and a preset data length bit_Length may be obtained. The network layer may also be called OP, representing an operation mode. For example, convolutional calculation is a kind of OP, and pooling calculation is also a kind of OP. The specified target network layer may be an OP having large model parameter dimension in the target models, such as Conv2d (convolutional function), FC (fully connected), etc.

After the trained target model is obtained, a topological structure of the target model is traversed to determine the target network layer, so as to process the model parameters in the target network layer.

The plurality of model parameters in the target network layer are divided into a plurality of groups corresponding to a plurality of channels respectively. For an i-th group among the plurality of groups, a model parameter having a largest absolute value in the i-th group is determined, in which the absolute value of the model parameter is expressed as $T_i$. An adjustment scale for the i-th group is shown in equation (1).

$$scale_i = \frac{T_i}{2^{bit\_length-1} - 1} \qquad \text{equation (1)}$$

After the adjustment scale $scale_i$ for the i-th group is obtained, each model parameter in the i-th group is processed according to equation (2) to convert the data type of the model parameter from the first data type to the second data type.

$$q = \text{round}\left[\frac{x}{scale_i}\right] \qquad \text{equation (2)}$$

where x indicates any model parameter of the first data type in the i-th group, q indicates a model parameter of the second data type, and round, for example, indicates a rounding calculation.

For each target network layer (OP) that has been compressed and quantized, the plurality of adjustment scales (corresponding to the plurality of groups of the target network layer) calculated for each target network layer are stored in an attribute file of the target network layer. The processed (compressed) target model includes, for example, the topological structure, the conventional model parameters (model parameters haven't been compressed and quantized), the compressed and quantized model parameters, the adjustment scales, etc.

After the data type of the model parameters is adjusted from the first data type to the second data type, the storage space for the model parameters is reduced. In this case, the processed target model may be sent to the edge device for storage or use. The edge device may store or use the processed target model as shown in FIG. 3.

A method of processing data for a target model according to exemplary embodiments of the present disclosure will be described with reference to FIG. 3 in conjunction with the system architecture of FIG. 1. The method of processing data for a target model according to the embodiment of the present disclosure may be implemented by the clients 101, 102, and 103 shown in FIG. 1, for example, and the clients 101, 102, and 103 may also be referred to as edge devices.

Figure 3:
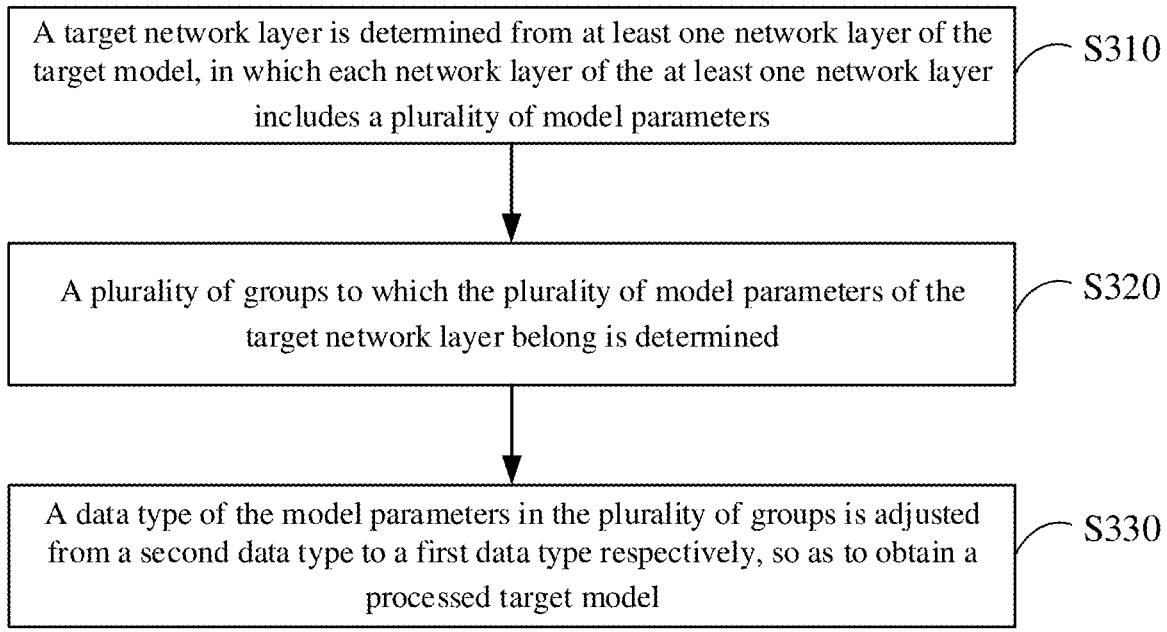
FIG. 3 schematically shows a flowchart of a method of processing data for a target model according to another embodiment of the present disclosure.

FIG. 3 schematically shows a flowchart of a method of processing data for a target model according to another embodiment of the present disclosure.

As shown in FIG. 3, the method 300 of processing data for a target model according to the embodiments of the present disclosure may include, for example, operations S310 to S330.

In operation S310, a target network layer is determined from at least one network layer of the target model, in which each network layer of the at least one network layer includes a plurality of model parameters.

In operation S320, a plurality of groups to which the plurality of model parameters of the target network layer belong is determined.

In operation S330, a data type of the model parameters in the plurality of groups is adjusted from a second data type to a first data type respectively, so as to obtain a processed target model.

The edge device stores the target model after acquiring the compressed and quantized target model. When the target model is used for relevant calculation, the target model is loaded, and the target network layer is determined from the target model. The data type of the plurality of model parameters in the target network layer is, for example, the second data type.

Exemplarily, the plurality of model parameters in the target network layer are divided into a plurality of groups, the plurality of groups to which the plurality of model parameters belong are determined, and the data type of the model parameters in the plurality of groups are adjusted from the second data type to the first data type respectively. An accuracy of data of the first data type is higher than an accuracy of data of the second data type, for example. Then, relevant calculation is performed using the target model having the model parameters of the first data type. For example, when the target model is a prediction model, a prediction may be performed using the target model having the model parameters of the first data type.

According to the embodiments of the present disclosure, after receiving the target model having the model parameters of the second data type, the received target model may be stored to reduce the storage space. When the target model needs to be used, the model parameters of the target model may be processed to adjust the model parameters to parameters with higher accuracy, so that the precision and accuracy of relevant calculation may be ensured when the target model is used for the calculation.

Each of the plurality of groups of the target network layer has a corresponding adjustment scale. The data type of model parameter(s) of each group of the plurality of groups is adjusted from the second data type to the first data type based on the adjustment scale corresponding to the each group. For example, the model parameter(s) of the second data type in each group is/are multiplied by the adjustment scale corresponding to each group, so as to obtain model parameter(s) of the first data type.

For example, an adjustment scale for an i-th group of the plurality of groups is $scale_i$. The calculation process of the model parameters of the first data type is as shown in equation (3).

$$x = q * scale_i \qquad \text{equation (3)}$$

where q indicates any model parameter of the second data type in the i-th group, and x indicates a model parameter of the first data type.

Figure 4:
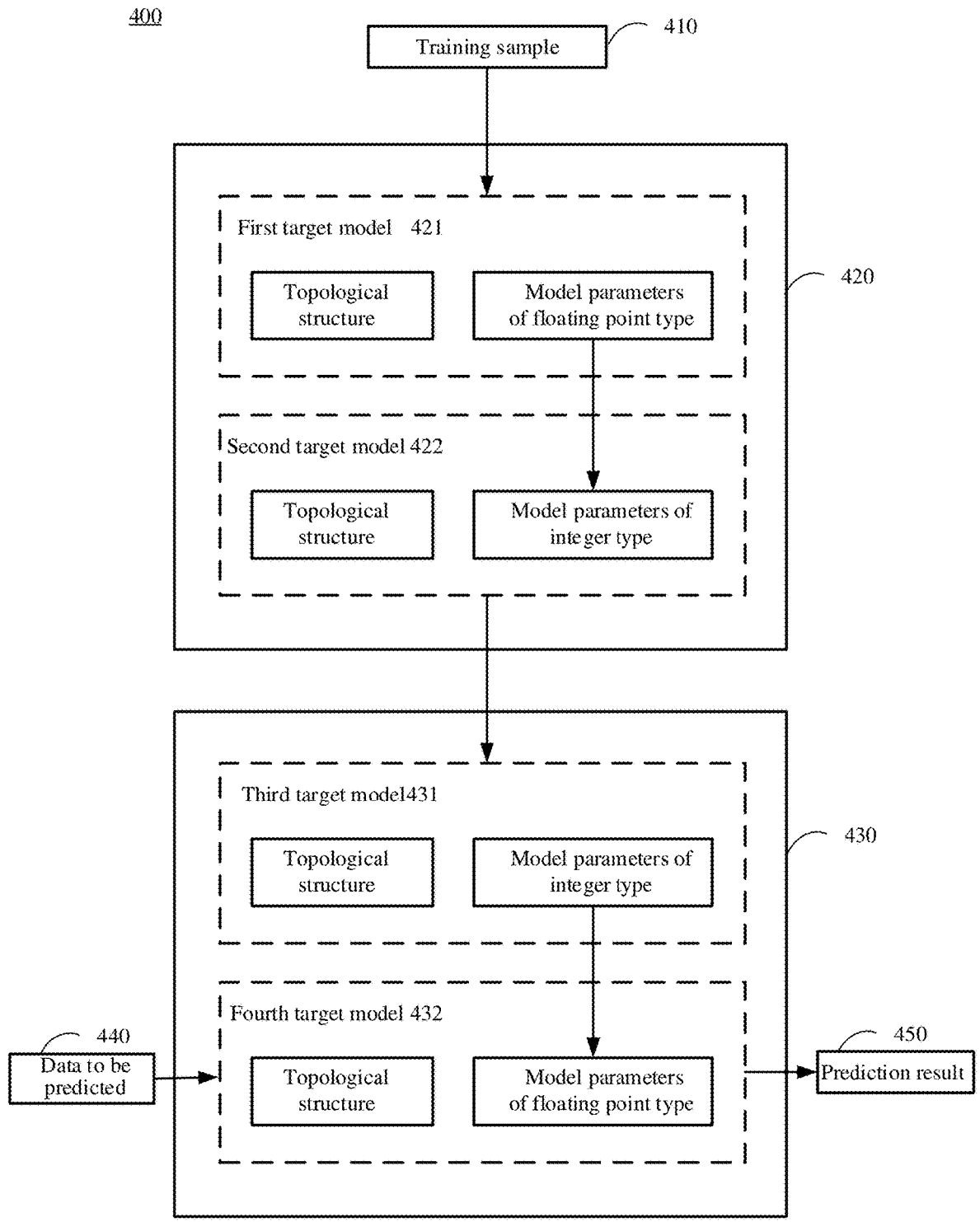
FIG. 4 schematically shows a schematic diagram of a method of processing data for a target model according to an embodiment of the present disclosure.

FIG. 4 schematically shows a schematic diagram of a method of processing data for a target model according to an embodiment of the present disclosure.

As shown in FIG. 4, the method 400 of processing data for a target model according to the embodiments of the present disclosure is implemented by an electronic device 420 and an edge device 430, for example.

For example, the electronic device 420 trains a prediction model using training sample 410 to obtain a trained first target model 421, including a topological structure and floating point type model parameters.

Due to a large data storage space for the model parameters of floating point type, the electronic device 420 may adjust the model parameters of floating point type to model parameters of integer type, in order to reduce the data storage space for the model parameters. After the model parameters of floating point type are adjusted to the model parameters of integer type, a second target model 422 is obtained.

Next, the electronic device 420 sends the second target model 422 to the edge device 430, or the edge device 430 may actively acquire the second target model 422 from the electronic device 420. After the edge device 430 obtains the second target model 422, the second target model 422 is stored as a third target model 431 in a first storage space. The first storage space may be a hard disk. Since the model parameters in the third target model 431 are model parameters of integer type, the third target model 431 has a small occupancy in the first storage space.

Then, the edge device 430 may perform a prediction task based on the third target model 431. For example, after receiving data to be predicted 440, the edge device 430 loads the model parameters of integer type into a second storage space, and adjusts the model parameters from integer type to floating point type to obtain a fourth target model 432. The model parameters of floating point type in the fourth target model 432 are further temporarily stored in the second storage space, for example, a memory. Next, the edge device 430 performs a prediction on the data to be predicted 440 using the fourth target model 432 to obtain a prediction result 450.

Figure 5:
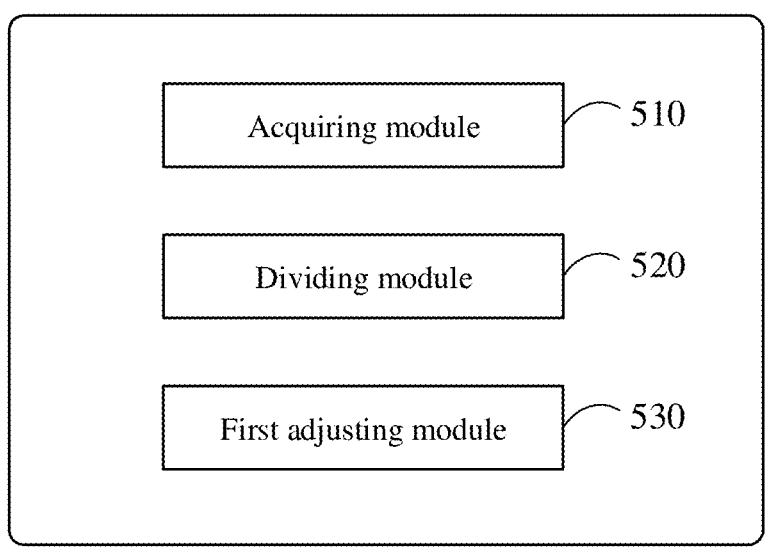
FIG. 5 schematically shows an apparatus of processing data for a target model according to an embodiment of the present disclosure.

FIG. 5 schematically shows an apparatus of processing data for a target model according to an embodiment of the present disclosure.

As shown in FIG. 5, the apparatus 500 of processing data for a target model according to the embodiments of the present disclosure includes, for example, an acquiring module 510, a dividing module 520, and a first adjusting module 530.

The acquiring module 510 is used to acquire the target model, the target model includes at least one network layer, and each network layer of the at least one network layer includes a plurality of model parameters. According to the embodiments of the present disclosure, the acquiring module 510 may, for example, perform the operation S210 described above with reference to FIG. 2, which will not be repeated here.

The dividing module 520 is used to, for a target network layer in the at least one network layer, divide the plurality of model parameters of the target network layer into a plurality of groups. According to the embodiments of the present disclosure, the dividing module 520 may, for example, perform the operation S220 described above with reference to FIG. 2, which will not be repeated here.

The first adjusting module 530 is used to adjust a data type of the model parameters in the plurality of groups from a first data type to a second data type respectively, so as to obtain a processed target model. According to the embodiments of the present disclosure, the first adjusting module 530 may, for example, perform the operation S230 described above with reference to FIG. 2, which will not be repeated here.

According to the embodiments of the present disclosure, the first adjusting module 530 includes a determining sub-module and an adjusting sub-module. The determining sub-module is used to determine an adjustment scale for each group of the plurality of groups to obtain a plurality of adjustment scales. The adjusting sub-module is used to adjust the data type of the model parameters of the plurality of groups from the first data type to the second data type respectively based on the plurality of adjustment scales, so as to obtain the processed target model.

According to embodiments of the present disclosure, the determining sub-module includes a determining unit and a calculating unit. The determining unit is used to determine a target model parameter from at least one model parameter included in the each group. The calculating unit is used to calculate the adjustment scale for the each group based on the target model parameter and a preset data length corresponding to the each group.

According to embodiments of the present disclosure, the target model parameter is a model parameter having a largest absolute value among the at least one model parameter included in the each group.

According to embodiments of the present disclosure, the adjusting sub-module is further used to: divide the at least one model parameter of the first data type in the each group by the adjustment scale corresponding to the each group, so as to obtain at least one model parameter of the second data type.

According to embodiments of the present disclosure, the first data type includes a floating point type and the second data type includes an integer type.

According to embodiments of the present disclosure, the plurality of model parameters of the target network layer includes model parameters for a plurality of channels; and the dividing module is further used to determine the model parameters for each channel of the plurality of channels as one group of model parameters.

Figure 6:
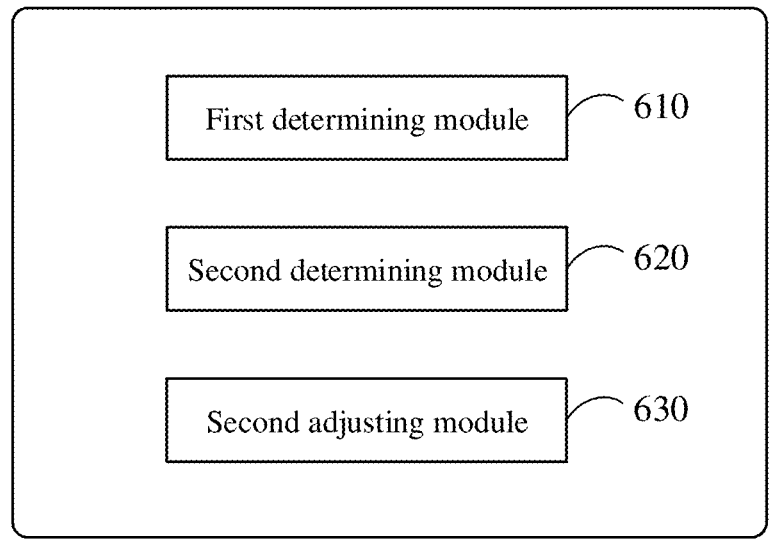
FIG. 6 schematically shows an apparatus of processing data for a target model according to another embodiment of the present disclosure.

FIG. 6 schematically shows an apparatus of processing data for a target model according to another embodiment of the present disclosure.

As shown in FIG. 6, the apparatus 600 of processing data for a target model according to the embodiments of the present disclosure includes, for example, a first determining module 610, a second determining module 620, and a second adjusting module 630.

The first determining module 610 is used to determine a target network layer from at least one network layer of the target model, each network layer of the at least one network layer includes a plurality of model parameters. According to the embodiments of the present disclosure, the first determining module 610 may, for example, perform the operation S310 described above with reference to FIG. 3, which will not be repeated here.

The second determining module 620 is used to determine a plurality of groups to which the plurality of model parameters of the target network layer belong. According to the embodiments of the present disclosure, the second determining module 620 may, for example, perform the operation S320 described above with reference to FIG. 3, which will not be repeated here.

The second adjusting module 630 is used to adjust a data type of the model parameters in the plurality of groups from a second data type to a first data type respectively, so as to obtain a processed target model. According to the embodiments of the present disclosure, the second determining module 630 may, for example, perform the operation S330 described above with reference to FIG. 3, which will not be repeated here.

According to embodiments of the present disclosure, the second adjusting module 630 is further used to adjust the data type of at least one model parameter of each group of the plurality of groups from the second data type to the first data type based on an adjustment scale corresponding to the each group.

According to embodiments of the present disclosure, the second adjusting module 630 is further used to multiply the at least one model parameter of the second data type in the each group by the adjustment scale corresponding to the each group, so as to obtain at least one model parameter of the first data type.

Collecting, storing, using, processing, transmitting, providing, and disclosing etc. of the personal information of the user involved in the present disclosure all comply with the relevant laws and regulations, are protected by essential security measures, and do not violate the public order and morals. According to the present disclosure, personal information of the user is acquired or collected after being authorized or permitted by the user.

According to embodiments of the present disclosure, the present disclosure further provides an electronic device, a readable storage medium, and a computer program product.

The electronic device shown in FIG. 7 below may be the electronic device shown in FIG. 1 or the client shown in FIG. 1.

Figure 7:
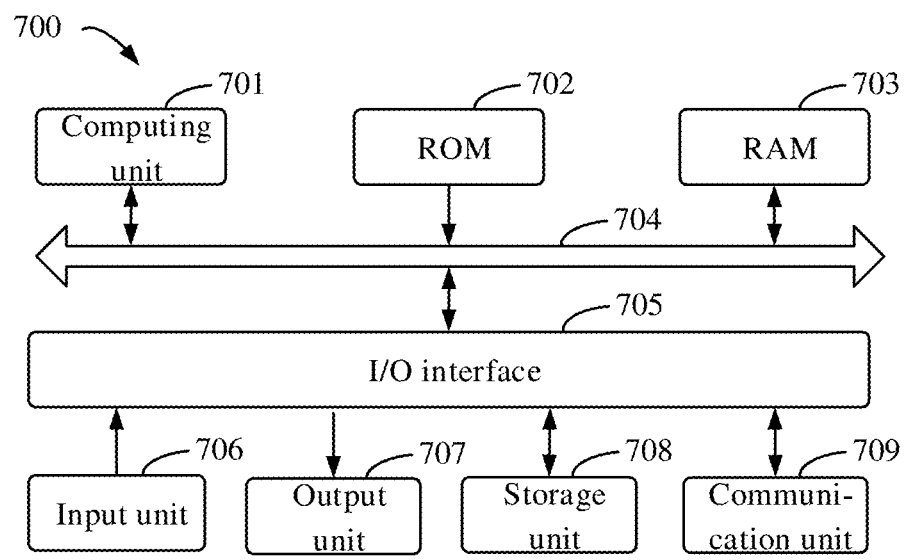
FIG. 7 shows a block diagram of an electronic device for processing data for a target model according to embodiments of the present disclosure.

FIG. 7 shows a block diagram of an electronic device for processing data for a target model according to embodiments of the present disclosure.

FIG. 7 shows a schematic block diagram of an exemplary electronic device 700 for implementing embodiments of the present disclosure. The electronic device 700 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the device 700 may also be stored. The computing unit 701, the ROM 702, and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/data with other devices through a computer network such as Internet and/or various telecommunication networks.

The computing unit 701 may be various general-purpose and/or a dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and processing described above, such as the method of processing data for a target model. For example, in some embodiments, the method of processing data for a target model may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method of processing data for a target model. Alternatively, in other embodiments, the computing unit 701 may be configured to execute the method of processing data for a target model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a load programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, a magnetic, an optical, an electromagnetic, an infrared, or a semiconductor system, apparatus, or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local region network (LAN), a wide region network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, the server may also be a server of a distributed system or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-described specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing data for a target model, applied to an electronic device, the method comprising:
acquiring the target model by training a model with training samples, wherein the target model comprises at least one network layer, and each network layer of the at least one network layer comprises a plurality of model parameters, a data type of the plurality of model parameters is a first data type;
for a target network layer in the at least one network layer, dividing the plurality of model parameters of the target network layer into a plurality of groups, including, for model parameters for a plurality of channels comprised in the plurality of model parameters of the target network layer, determining the model parameters for each channel of the plurality of channels as one group of model parameters, to obtain the plurality of groups respectively corresponding to the plurality of channels;
adjusting a data type of the model parameters in the plurality of groups from the first data type to a second data type respectively based on a plurality of adjustment scales respectively corresponding to the plurality of groups, so as to obtain a processed target model, wherein model parameters of the first data type occupy more storage resources than model parameters of the second data type, each of the plurality of adjustment scales is determined based on a target model parameter, and the target model parameter is determined from at least one model parameter included in each group corresponding to each adjustment scale; and
sending the processed target model to an edge device, so that the edge device, after receiving data to be predicted, loads the model parameters of the second data type stored in a hard disk into a memory, and adjusts the model parameters from the second data type to the first data type.

2. The method according to claim 1, wherein the adjusting a data type of the model parameters of the plurality of groups from a first data type to a second data type respectively, so as to obtain a processed target model comprises:
determining an adjustment scale for each group of the plurality of groups to obtain the plurality of adjustment scales; and
adjusting the data type of the model parameters of the plurality of groups from the first data type to the second data type respectively based on the plurality of adjustment scales, so as to obtain the processed target model.

3. The method according to claim 2, wherein the determining an adjustment scale for each group of the plurality of groups comprises:
determining the target model parameter from at least one model parameter included in the each group; and
calculating the adjustment scale for the each group based on the target model parameter and a preset data length corresponding to the each group.

4. The method according to claim 3, wherein the target model parameter is a model parameter having a largest absolute value among the at least one model parameter included in the each group.

5. The method according to claim 2, wherein the adjusting the data type of the model parameters of the plurality of groups from the first data type to the second data type respectively based on the plurality of adjustment scales comprises dividing the at least one model parameter of the first data type in the each group by the adjustment scale corresponding to the each group, so as to obtain at least one model parameter of the second data type.

6. The method according to claim 1, wherein the first data type comprises a floating point type and the second data type comprises an integer type.

7. An electronic device, comprising:
at least one processor; and
a memory communicatively connected to the at least one processor, wherein the memory stores instructions executable by the at least one processor, and the instructions, when executed by the at least one processor, cause the at least one processor to at least implement the method according to claim 1.

8. The electronic device according to claim 7, wherein the instructions are further configured to cause the at least one processor to:
determine an adjustment scale for each group of the plurality of groups to obtain a plurality of adjustment scales; and
adjust the data type of the model parameters of the plurality of groups from the first data type to the second data type respectively based on the plurality of adjustment scales, so as to obtain the processed target model.

9. The electronic device according to claim 8, wherein the instructions are further configured to cause the at least one processor to:
determine a target model parameter from at least one model parameter included in the each group; and calculate the adjustment scale for the each group based on the target model parameter and a preset data length corresponding to the each group.

10. The electronic device according to claim 9, wherein the target model parameter is a model parameter having a largest absolute value among the at least one model parameter included in the each group.

11. The electronic device according to claim 8, wherein the instructions are further configured to cause the at least one processor to divide the at least one model parameter of the first data type in the each group by the adjustment scale corresponding to the each group, so as to obtain at least one model parameter of the second data type.

12. The electronic device according to claim 7, wherein the first data type comprises a floating point type and the second data type comprises an integer type.

13. A non-transitory computer-readable storage medium having computer instructions therein, the computer instructions, when executed by a computer system, are configured to cause the computer system to at least implement the method according to claim 1.

14. The medium of claim 13, wherein the adjustment of a data type of the model parameters of the plurality of groups from a first data type to a second data type respectively, so as to obtain a processed target model comprises:
   determination of an adjustment scale for each group of the plurality of groups to obtain the plurality of adjustment scales; and
   adjustment of the data type of the model parameters of the plurality of groups from the first data type to the second data type respectively based on the plurality of adjustment scales, so as to obtain the processed target model.

15. A method of processing data for a target model, applied to an edge device, the method comprising:
   in response to acquiring the target model from an electronic device, storing model parameters of the target model into a hard disk of the edge device, wherein a data type of the model parameters of the target model is a second data type;
   in response to receiving data to be predicted, loading the target model from the hard disk to a memory of the edge device;
   determining a target network layer from at least one network layer of the target model, wherein each network layer of the at least one network layer comprises a plurality of model parameters;
   determining a plurality of groups to which the plurality of model parameters of the target network layer belong, wherein the plurality of model parameters of the target network layer comprises model parameters for a plurality of channels, the plurality of channels respectively corresponds to the plurality of groups, and model parameters for each channel is a group of the plurality of groups;
   adjusting the data type of the model parameters in the plurality of groups from the second data type to a first data type respectively based on a plurality of adjustment scales respectively corresponding to the plurality of groups, so as to obtain a processed target model, wherein model parameters of the processed target model are stored in the memory, model parameters of the second data type occupy fewer storage resources than model parameters of the first data type, each of the plurality of adjustment scales is determined based on a target model parameter, and the target model parameter is determined from at least one model parameter included in each group corresponding to each adjustment scale; and
   performing a prediction on the data to be predicted by using the processed target model to obtain a prediction result.

16. The method according to claim 15, wherein the adjusting a data type of the model parameters in the plurality of groups from a first data type to a second data type respectively comprises adjusting the data type of at least one model parameter of each group of the plurality of groups from the second data type to the first data type based on an adjustment scale corresponding to the each group.

17. The method according to claim 16, wherein the adjusting the data type of at least one model parameter of each group of the plurality of groups from the second data type to the first data type based on an adjustment scale corresponding to the each group comprises multiplying the at least one model parameter of the second data type in the each group by the adjustment scale corresponding to the each group, so as to obtain at least one model parameter of the first data type.

18. An electronic device, comprising:
   at least one processor; and
   a memory communicatively connected to the at least one processor, wherein the memory stores instructions executable by the at least one processor, and the instructions, when executed by the at least one processor, cause the at least one processor to at least implement the method according to claim 8.

19. A non-transitory computer-readable storage medium having computer instructions therein, the computer instructions, when executed by a computer system, are configured to cause the computer system to at least implement the method according to claim 15.

20. The medium of claim 19, wherein the adjustment of a data type of the model parameters in the plurality of groups from a first data type to a second data type respectively comprises adjustment of the data type of at least one model parameter of each group of the plurality of groups from the second data type to the first data type based on an adjustment scale corresponding to the each group.

* * * * *